(12) United States Patent
Sparks et al.

(10) Patent No.: US 8,335,774 B2
(45) Date of Patent: *Dec. 18, 2012

(54) REPLACING A MASTER MEDIA FILE

(75) Inventors: David L. Sparks, Cupertino, CA (US); Marco Nelissen, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/914,657

(22) Filed: Oct. 28, 2010

(65) Prior Publication Data

US 2012/0109997 A1    May 3, 2012

(51) Int. Cl.
G06F 17/30 (2006.01)
(52) U.S. Cl. .................................. 707/694; 707/758
(58) Field of Classification Search ............ 707/694, 707/758
See application file for complete search history.

(56) References Cited

U.S. PATENT DOCUMENTS

| | | | |
|---|---|---|---|
| 2003/0089218 A1* | 5/2003 | Gang et al. | 84/615 |
| 2005/0108303 A1 | 5/2005 | Carter | |
| 2006/0114763 A1* | 6/2006 | Nakamae et al. | 369/30.28 |
| 2006/0116965 A1 | 6/2006 | Kudo et al. | |
| 2006/0195516 A1 | 8/2006 | Beaupre | |
| 2007/0131097 A1 | 6/2007 | Lu et al. | |
| 2008/0065844 A1 | 3/2008 | Heller | |
| 2008/0092168 A1* | 4/2008 | Logan et al. | 725/44 |
| 2008/0165906 A1 | 7/2008 | Ho et al. | |
| 2009/0031384 A1* | 1/2009 | Brooks et al. | 725/127 |
| 2009/0055426 A1 | 2/2009 | Kalasapur et al. | |
| 2009/0077084 A1* | 3/2009 | Svendsen | 707/9 |
| 2009/0104938 A1 | 4/2009 | Tang | |
| 2009/0164516 A1 | 6/2009 | Svendsen et al. | |
| 2009/0254593 A1 | 10/2009 | Halim et al. | |
| 2010/0010944 A1* | 1/2010 | Cheng et al. | 706/12 |
| 2010/0057658 A1 | 3/2010 | Fein et al. | |
| 2010/0083303 A1 | 4/2010 | Redei et al. | |
| 2012/0066601 A1* | 3/2012 | Zazula et al. | 715/733 |

OTHER PUBLICATIONS eHow.com. "How to Sync a Playlist on an iPod." [Retrieved on Aug. 11, 2010]. Retrieved from the Internet URL: <http://www.ehow.com/how_2016218_sync-playlist.ipod.html> 1 page.

MP3Tunes. "MPTunes—Fre online MP3 file storage and backup." Sep. 12, 2007 [Retrieved on Aug. 9, 2010]. Retrieved from the Internet <URL: http://www.online-tech-tips.com/cool-websites/mp3tunes-free-online-mp2...> 6 pages.

(Continued)

Primary Examiner — Son T Hoang
(74) Attorney, Agent, or Firm — Fish & Richardson P.C.

(57) ABSTRACT

Methods, systems and program products for replacing a master media file. Data indicates characteristics of a first user's multiple media files. At least one of the multiple media files matches content in a master media file. The content in the matching media file is of a second quality that is higher than the first quality of the master media file. A server system stores the matching media file in place of the master media file. The server system receives a request from a second user for content matching the master media file, and accesses quality parameters that indicate the second user can access a version of the content at a third quality that is less than the second quality. A media file that contains the requested content at the third quality is generated and sent to the second user.

19 Claims, 5 Drawing Sheets

OTHER PUBLICATIONS

Ortutay, Barbara. "Startup mSpot lets you stream your music over Web." [Retrieved on Jun. 28, 2010]. Retrieved from the Internet <URL: http://abcnews.go.com/Technology/wireStory?id=11036314> 2 pages.

Wikipedia, "MP3.com." [Retrieved on Oct. 27, 2010]. Retrieved from the Internet <URL: http://en.wikipedia.org/wiki/MP3.com> 4 pages.

Cotton et al. "Audio fingerprinting to identify multiple videos of an event." Acoustics Speech and Signal Processing (ICASSP), 2010 IEEE International Conference, IEEE, Piscataway, NJ, Mar. 2010, pp. 2386-2389.

Sinitsyn, A. "Duplicate Song Detection Using Audio Fingerprinting for Consumer Electronics Devices," 2006 IEEE Tenth International Symposium, Jun. 2006, pp. 1-6.

Authorized Officer K. Sommermeyer. International Search Report and Written Opinion in international application No. PCT/US2011/055804, dated Dec. 15, 2011, 12 pages.

* cited by examiner

Variations of Media Content Quality

| | Low Quality Level | High Quality Level |
|---|---|---|
| Length | A (B) C (B) D (B) | A (B) (B) C (B) (B) D (B) (B) E (B) (B) |
| Metadata | • Artist Name<br>• Song Name<br>• Album Name | • Artist Name<br>• Song Name<br>• Album Name<br>• Artwork<br>• Lyrics<br>• Website<br>• Distributor<br>• A capella version<br>• Instrumental version |
| Bit rate | 128 kbps | 192 kbps |
| Codec / File Type | Codec A | Uncompressed |
| Defects | (defects present) | (no defects) |

FIG. 3

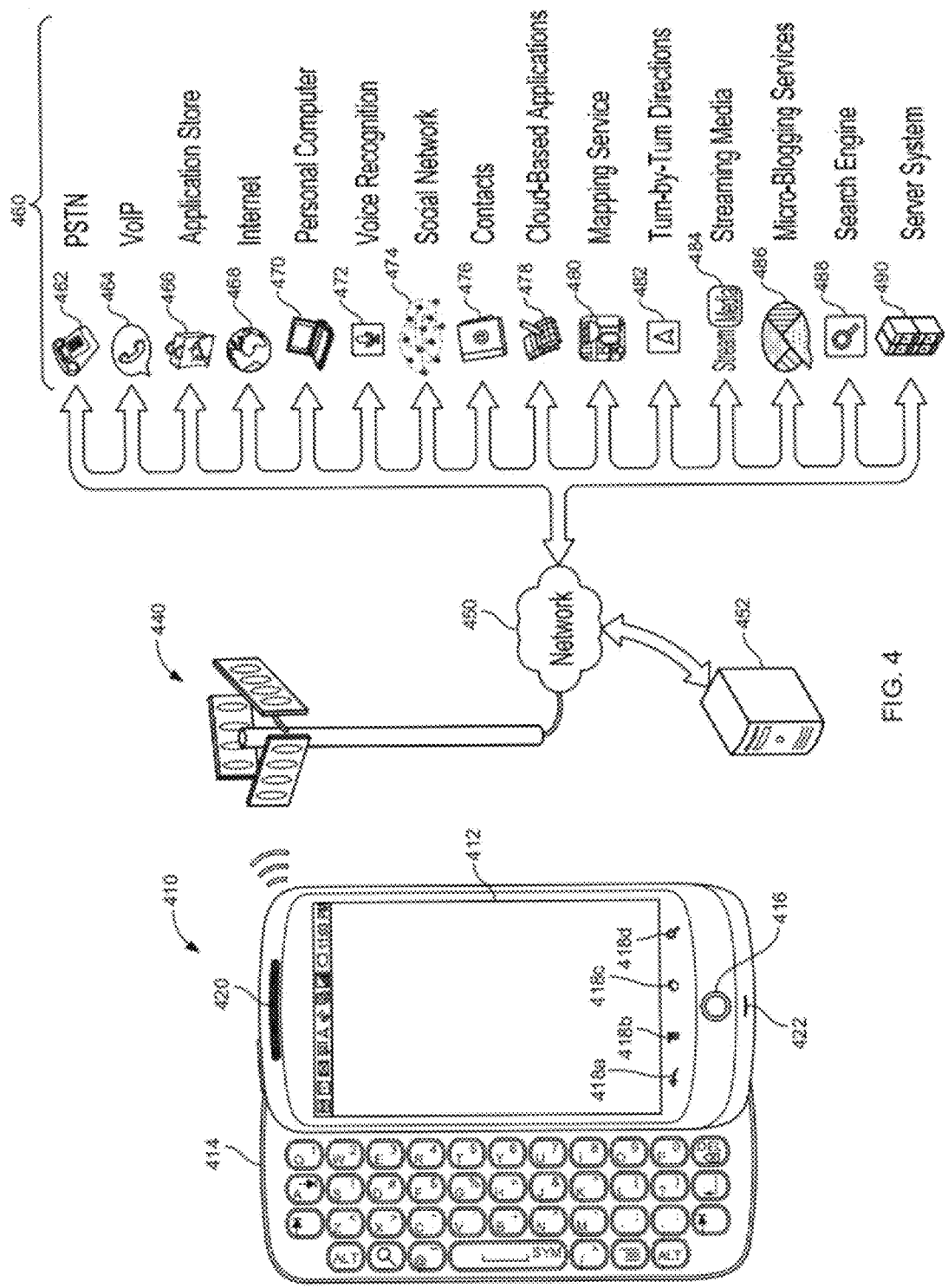

REPLACING A MASTER MEDIA FILE

TECHNICAL FIELD

This document generally relates to storing media files.

BACKGROUND

Consumers of media (e.g., music and video) increasingly store their media collections as files that are locally-accessible on a computing device, instead of on compact discs (CDs), digital video discs (DVDs), or tapes. The consumers may obtain the media files by ripping music and video files from CDs and DVDs, or by downloading the media files from online media stores.

SUMMARY

In general, one aspect of the subject matter described in this specification can be embodied in a computer-implemented method for storing media files. The method includes storing, at a server system, a master media file, the master media file containing content at a first quality level. The method includes accessing, by the server system, data that indicates characteristics of multiple media files that are stored for a user on a first user device. The method includes determining, by the server system, that at least one of the multiple media files is a matching media file that includes content matching the content contained in the master media file. The method includes determining, by the server system, that the content contained in the matching media file is of a second quality level that is higher than the first quality level of the content contained in the master media file. The method includes, in response to determining that the content contained in the matching media file is of a second quality level that is higher than the first quality level, storing, at the server system, the received matching media file in place of the master media file. The method includes receiving, at the server system, a request from a second user device associated with a second user and for content that matches the content in the master media file. The method includes accessing, at the server system, quality parameters associated with the requested content and the second user, the quality parameters indicating that the second user is allowed access to a version of the requested content at a third quality level that is less than the second quality level. The method includes generating, based on the stored matching media file and the accessed quality parameters, a media file that contains the requested content at the third quality level. The method includes sending the generated media file to the second user device.

This and other aspects can optionally include one or more of the following features. The accessed data may be generated by the user device. The data may include acoustic fingerprints of the multiple media files, where an acoustic fingerprint is a digital summary of a media file that has been deterministically generated from an audio signal that is stored within the media file. The acoustic fingerprint may be generated by applying a fast Fourier transform algorithm to the audio signal. The accessed data may be generated by the server system.

Determining that at least one of the multiple media files is a matching media file may include determining that an acoustic fingerprint of the matching media file matches an acoustic fingerprint of the master media file. Determining that the content contained in the matching media file is of a second quality level that is higher than the first quality level of the content contained in the master media file may include determining that the matching media file encodes an audio signal at a higher bit rate than the master media file. Determining that the content contained in the matching media file is of a second quality level that is higher than the first quality level of the content contained in the master media file may include determining that the matching media file encodes an audio signal at a same bit rate as the master media file but that the matching media file includes fewer defects in the audio signal that are caused during an encoding process for the audio signal than the master media file.

The accessed quality parameters may specify defects that are caused during an audio encoding process. Generating the media file may include placing the defects that are specified by the quality parameters into the master media file. Generating the media file may include generating a shorter length version of the master media file, the length of the generated media file being specified by the accessed quality parameters. The length of the generated media files may be identified by one or more sets of start times and end times with respect to a playing time of the master media file. Sending the generated media file to the second user device may cause the second user device to display a prompt that the second user purchase a version of the generated media file that is of a higher quality level than the generated media file and that can be generated from the master media file.

Storing the received matching media file in place of the master media file may include deleting the master media file from the server system. The method may include receiving, by the server system and from a third user device that that stores a plurality of media files for the second user, second data that includes the quality parameters of the plurality of media files stored for the second user. The second data may include metadata that specifies a title and an author for each of the media files; and where generating the media file may include placing the metadata into the generated media file.

Other embodiments of the described aspects include corresponding computer-readable storage devices storing instructions that, when executed by one or more processing devices, perform operations according to the above-described methods. Other embodiments may include systems and apparatus that include the described computer-readable storage devices and that are configured to execute the operations using one or more processing devices.

Another aspect of the subject matter described in this specification can be embodied in a computer implemented method. The method includes transmitting, by a first user device and to a server system that is remote from the first user device and that has stored a master media file that contains content at a first quality level, data that indicates characteristics of multiple media files that are stored for a user on the first user device. The transmission of the data causes the server system to determine that at least one of the multiple media files is a matching media file that includes content matching the content contained in the master media file. The transmission of the data causes the server system to determine that the content contained in the matching media file is of a second quality level that is higher than the first quality level of the content contained in the master media file. The transmission of the data causes the server system to, in response to determining that the content contained in the matching media file is of a second quality level that is higher than the first quality level, store the received matching media file in place of the master media file. The transmission of the data causes the server system to receive a request from a second user device associated with a second user and for content that matches the content in the master media file. The transmission of the data causes the server system to access quality parameters associated with the requested content and the second user, the quality parameters indicating that the second user is allowed access to a version of the requested content at a third quality level that is less than the second quality level. The transmission of the data causes the server system to generate, based on the stored matching media file and the accessed quality parameters, a media file that contains the requested content at the third quality level. The transmission of the data causes the server system to send the generated media file to the second user device. The transmission of the data causes the server system to receive, by the first user device and from the server system, the generated media file.

Other embodiments of the described aspects include corresponding computer-readable storage devices storing instructions that, when executed by one or more processing devices, perform operations according to the above-described methods. Other embodiments may include systems and apparatus that include the described computer-readable storage devices and that are configured to execute the operations using one or more processing devices.

In yet another aspect, the subject matter described in this specification can be embodied in a system for storing media files. The system includes a media file analyzer, at a server system that has stored a master media file that contains content at a first quality level. The media file analyzer is programmed to receive data that indicates characteristics of multiple media files that are stored for a user on a first user device. The media file analyzer is programmed to determine that at least one of the multiple media files is a matching media file that includes content matching the content contained in the master media file. The media file analyzer is programmed to determine that the content contained in the matching media file is of a second quality level that is higher than the first quality level of the content contained in the master media file. The media file analyzer is programmed to, in response to determining that the content contained in the matching media file is of a second quality level that is higher than the first quality level, store the received matching media file in place of the master media file. The system includes a media file generator, at the server system. The media file generator is programmed to receive a request from a second user device associated with a second user and for content that matches the content in the master media file. The media file generator is programmed to access quality parameters associated with the requested content and the second user, the quality parameters indicating that the second user is allowed access to a version of the requested content at a third quality level that is less than the second quality level. The media file generator is programmed to generate, based on the stored matching media file and the accessed quality parameters, a media file that contains the requested content at the third quality level. The media file generator is programmed to send the generated media file to the second user device.

Additional aspects can optionally include one or more of the following features. The system may include a fingerprint generator that is programmed to generate a digital summary of an audio signal stored in a media file. A fingerprint that is generated for the matching media file and a fingerprint that is generated for the master media file may be used in the determination by the media file analyzer that the matching media file includes content matching the content contained in the master media file. The system may include a media file updater that is programmed to, in response to the media file analyzer storing the received matching media file in place of the master media file, delete from the server system the master media file. The media file updater may be programmed to delete, in addition to the master media file, another master media file that the media file analyzer has determined to include content that matches the content of the matching media file.

Particular embodiments can be implemented, in certain instances, to realize one or more of the following advantages. A quantity of computer-readable memory for operating an internet-based media storage service may be reduced, potentially reducing service costs or allowing provision of added functionality for the same cost. Such a storage system may enable individuals to store their entire media collections to the internet and access the media collections from various computing devices. Accordingly, users may purchase devices with reduced memory storage, and instead store at least portions of their media collections online.

The details of one or more implementations are set forth in the accompanying drawings and the description below. Other features, objects, and advantages will be apparent from the description and drawings, and from the claims.

DESCRIPTION OF DRAWINGS

FIG. 3 illustrates examples of variations in media content quality level.

FIG. 4 is a diagram of a system that may be used to implement the systems and methods described in this document.

Like reference symbols in the various drawings indicate like elements.

DETAILED DESCRIPTION

Figure 1:
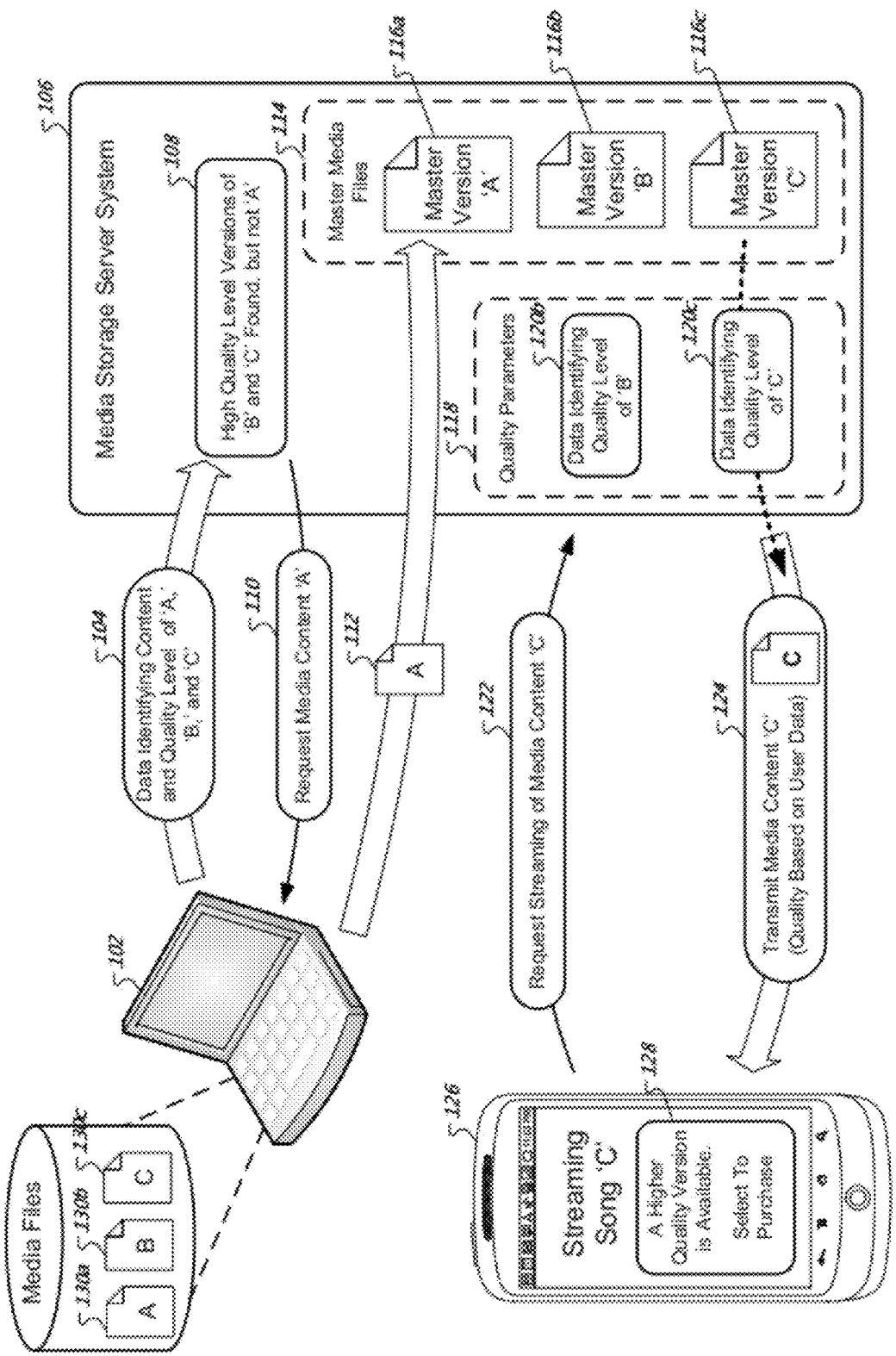
FIG. 1 illustrates an example of a process and system for performing media file storage.

This document generally describes a system for providing media file storage. A media storage service may be provided over a network and users of the service may upload their media collections to a server system that is accessible over the network. The users may download or stream media files that the users have previously uploaded to the server system.

Multiple users may upload varying versions of the same media content (e.g., where each version is the media content encoded at a different bit rate). Storing each of these varying versions, however, may be expensive. Accordingly, the server system may store a single "master" media file that contains media content at a first quality level, and that allows the server system to recreate media files with lower quality level versions of the content from the master media file.

Thus, the server system may remember the quality level of the content in media files that a user uploads to the media service. As a result, if the user requests from the media service a previously uploaded media file, the server system may be able generate a media file with content of the same quality level as the file that was originally uploaded (assuming that the requested media file is not the master media file). The generated media file may be transmitted to the user.

A user may upload a media file that includes content that matches the content of a master media file that is stored at the server system. If the content in the uploaded media file is of higher quality level than the master media file, the server system may replace the master media file with the uploaded media file, and the file that was previously the master media file may be deleted from the server system. Information may be stored for an account of a user that had uploaded the previous master file, where the information may indicate a quality level of the previous master file and reference the newly uploaded master file, to enable recreation of the previous master file from the newly uploaded master file.

In some examples, the media file that contains the low quality level version of media content may include similar content and audio-visual quality level as the content in the master media file (e.g., the content may be encoded with a same bit rate and stored with a same file type), but the low quality level version of the media content may be a shorter length than the high quality level version of the media content that is stored in the master media file. In other words, the low quality level media content may be a subset of the high quality level media content. In some examples, the low quality level version of the media content includes defects that may not be found in the high quality level version of media content. In some examples, a low quality level version of the media content includes a subset of types of media content included in a high quality level version of the media content. For example, the low quality level version may include only audio, where the high quality level content may include audio and video. In some examples, when the user receives a reconstructed media file from the server system, the user is prompted to purchase a higher quality level version of the content found in the reconstructed media file.

FIG. 1 illustrates an example of a process and system for performing media file storage. In this illustration, computing device 102 analyzes its media catalog and sends data 104 that identifies the content and quality level of the catalog to the media storage server system 106. The server system 106 determines (at box 108) which of the media files in the catalog include content that matches the content of master media files 114 at the server system, and whether the files which are uploaded include content of higher quality level than the content in the master media files 114. The process of uploading may include providing the server system 106 with data 104 (and in some instances media content 112) that enables the server system to transmit the content of the media catalog to another computing device.

Those uploaded files that include content that matches the content of a master media file are referred to as matching media files. For those matching media files that match a master media file that includes content of a higher quality level (or a same quality level), the server system stores quality parameters that can be used to reconstruct, from the master file, the matching file which was uploaded. Accordingly, the server system may not store the actual file that has been purportedly uploaded (only data that can be used to reconstruct the file from its master version).

For other media files (e.g., those uploaded media files for which a master media file with matching content is not found, or where a master media file is found to include matching content but where the matching content is of a lower quality level than the content of the uploaded media file), the server system stores the uploaded media file. The media file may be stored in response to a request (at box 110) to transmit the media file to the server system 106.

As noted above, the server system stores master media files (box 114), from which all media files that have been "uploaded" to the server system may be recreated for transmission back to computerized devices at which the uploading users have logged in. Thus, when a user device (e.g., device 126) requests media content (at box 122), the requested media content may be provided to the user device in a media file that is generated by the server system (at box 124). The media file that is provided to the user device may be generated from a master media file based on the quality parameters that were stored for the particular user in response to the particular user having previously uploaded a the media content to the server system 106.

In more detail, computing device 102 is illustrated as a laptop computer, and includes local, non-networked memory that includes three media files (media files 130a-c). A media file may be a file that digitally represents media content (e.g., any combination of audible sound, video, or images). For example, a media file may store a digital representation of music in an MP3 file format, a digital representation of a video in an AVI file format, or a digital representation of an image in a JPG format. The media files may be purchased from physical retailers or online retailers. For example, a user may drive to a music store, purchase a CD music album, and copy the contents of the CD to his computer. Similarly, the user may visit an online website for a music store by visiting a website, searching for a music artist, and selecting a link to download a music file that is displayed in response to the search.

Although three media files are provided in this illustration, the number of media files may be in the thousands, and may occupy significant storage space. The media collection may have taken significant time commitment to gather and may have cost substantial sums of money. Accordingly, a user may want to access the media collection on multiple devices, and may want to ensure that the user does not lose his music collection. Thus, the user may upload his media file collection to the "cloud" (e.g., an internet-based media storage service that is hosted over a server system). Media files may consume significant amounts of space, and thus a mechanism for reducing the number of files that are stored for multiple different users by the media storage service is described herein.

The user of the computing device 102 may upload the media files 130 by visiting a website that is hosted by the media storage service. At the website, the user may select a link that causes a dialog box to appear for specifying files that should be uploaded to the media storage service. The user may specify particular media files, media file types, or directories of media files that the user would like to upload to the media storage service. In another example, the user launches an application program that is hosted locally on the computing device 102, and the application program searches the user's computing device for files to upload to the media storage service. In another example, a user of a mobile telephone launches an application program that is for the media storage service. The mobile telephone application program may allow the mobile telephone to push its media collection to the cloud, or otherwise sync its media collection with the media collection that is stored in the cloud.

The computerized device 102 may collect or generate data that identifies the media files and that identifies the quality level of the media files. The data that is transmitted for a particular media file may include any appropriate combination of, for example: (i) size of the media file (e.g., 3.4 megabytes), (ii) a file format (e.g., MP3), (iii) a codec, (iv) a bit rate (e.g., 224 kbits/s), (v) a fingerprint (e.g., an acoustic fingerprint), (vi) timed length, and (vii) media content metadata. A file format may define the type of one or more layers of audio and/or video data that is contained within the file. A codec may be used to encode and decode the raw audio and/or video data that can be stored within a media file. The bit rate generally refers to the amount of information, or detail that is stored per unit of time of a recording.

A fingerprint may be a condensed digital summary that is deterministically generated from the content in the media file. For example, an acoustic fingerprint may be deterministically generated from an audio signal stored in an audio file, and may potentially be used to quickly locate audio files of similar content in a database. An acoustic fingerprint may not be a bitwise fingerprint, as two songs that sound the same and have the same pitch may not be a straight binary match. The acoustic fingerprint may be generated by performing a fast Fourier transform on the media file. In various examples, the acoustic fingerprint is not generated using textual metadata that is stored for the media content stored in the file. Similar mechanisms may be performed to generate a fingerprint from a video file. In various examples, an acoustic and visual fingerprint may be generated for a video file that includes audio and video content.

Metadata may be textual data that describes the media content in the media file. The metadata may be included as part of the media file. Accordingly, the media file may include a content portion (e.g., encoded audio and video) and a metadata portion (e.g., text that describes the content). Portions of the metadata may be accompanied by data elements that define a context for each of the portions of metadata. As an illustration, metadata may define associated musical content, for example, a name of the musical song, a name of the artist of the song, a name of the album, an image file of the cover art for the album, song lyrics, a length of the song, and a genre of the song, as some examples. The description with reference to FIG. 1 continues with reference to media files that include musical content, as an illustration, although the description may apply to media files that include other types of media content (e.g., video content).

The characteristics for each of the songs in the media file collection may be transmitted to the server system. In some implementations, the media file that includes the song itself is transmitted to the server system, which extracts the characteristics (e.g., content identifying and quality identifying characteristics). In either event, the server system receives the characteristics for each of the songs and performs a process to identify matching songs at the server system.

The matching songs are identified as media content within master media files 114 that are stored by the server system 106 (e.g., as part of a database that is accessible to the server system). As described in more detail below, the master media files may be media files that include a highest-quality level version of musical content that the server system has been exposed to from a community of users of the media storage service. As a simple illustration, each song by an artist may have a single master media file from which various variations in quality level of the song may be generated.

The server system 106 may determine that an uploaded media file includes musical content that matches the content in a master media file if a fingerprint for a portion of the uploaded musical content is found to match a fingerprint for a portion of the content in the master media file. In some examples, all portions of the uploaded musical content may need to match portions of the content in a master media file for there to be a match, however, all portions of the content in the master media file may need not match the content in the uploaded media file. In other words, the uploaded media content may be a subset of the content that is stored by the master media file (e.g., where the content in the master media file may include an additional verse that is not in the uploaded musical content).

In some examples, the server system 106 determines that media content that has been uploaded matches the content in a master media file if the metadata, or portions thereof, that is associated with the content matches. For example, if an artist name and a song name for a song in an uploaded media file are the same as or similar to the artist name and song name for a master media file, then the songs may match. Similarly, if the songs are determined to be from the same album, have similar lyrics, or share artwork, there may be an increased chance that the songs are a match. In some examples, uploaded media content is determined to match a master media file based on a combination of matching metadata and matching musical content (e.g., based on acoustic fingerprints).

If an uploaded media file includes media content that is determined to not have matching media content at the server system, the uploaded media file may be stored at the server system and designated as a master media file for the media content. Thus, should another user of the media storage service upload the same media content (but possibly with a different quality level), the server system may identify that a matching song exists.

Once a match has been identified, the server system 106 determines a "quality level" of the content in the uploaded media file with respect to the content in the respective master media file. Effectively, the server system 106 determines whether the content in the media file that is being uploaded is of a higher quality level than the content in the master media file that is presently stored at the server system. Media content quality level may be determined based on any combination and weighting of: (i) bit rate of the file that includes the media content, (ii) a format of the file that includes the media content, (iii) a played length of the media content, and (iv) and defects in the media content. For example, a first song may be determined to be of higher quality level than a second song if a bit rate of the first song is higher than a bit rate of the second song, all other quality characteristics being equal. File formats may have a predetermined ranking, for example, where uncompressed audio formats (e.g., WAV and AIFF) are considered to be of higher quality level than lossless compressed audio formats (e.g., FLAC or ALAC), which may be considered of higher quality level than lossy compressed file formats (e.g., MP3 and WMA).

In various examples, a temporal length of the media content, as played to a user, may be used as an indication of media content "quality level." For example, a highest quality level album version of a song may include multiple repeats of a chorus and five different verses. A lower quality level radio version of the song may include only three verses and a single repeat of the chorus for each verse. An even lower quality level version of the song may be a ringtone that includes a short snippet of the chorus from a middle portion of the higher quality level album version (where the snippet may be denoted by a start playing time and an end playing time of the album version of the song).

In various examples, a higher quality level version of media content may be media content that includes fewer defects than other media content, even if other factors, such as bit rate, are the same. For example, media content may include skips, pops or other problems that may result from corrupted portions of the file or defects in the source (e.g., the CD from which the media content was recorded may have been scratched).

If media content which is uploaded is determined to match the content in a master media file, but is determined to be of lower quality level than content in the master media file, the server system 106 may store information that allows the "uploaded" media file to be reconstructed from the master version, but may not store the actual media content that exists on the user device 102 (and the server system may not have actually received the media content that resists on the user device 102). For example, the server system may store an indication of bit rate, file type, length of song, and data indicating what portions of the content in the master media file are used to compose the uploaded version of the song. Further, the server system may have stored all of the metadata that was associated with the media content that was uploaded, so that when the media content is later reconstructed as part of a master media file, the metadata may be placed into the reconstructed media file.

If media content which is uploaded is determined to match the content in a master media file, and is determined to be of higher quality level than content in the master media file, the server system 106 may store the uploaded media file in place of the master media file at the server system. Thus, the uploaded media file may become the new master media file for the particular media content that is stored in the media file. In some examples, information that identifies the media content in a user's media catalog indicates that a master media file includes the media content that is the same quality level as the media content that the user uploaded to the server system. In such examples, the server system may or may not separately store the metadata information from the media file because the media file may not need to be reconstructed (i.e., the master media file may be transmitted to the user device).

In some examples, the antiquated "master" version of the media file is deleted. Thus, only one version of media content may be stored so as to reduce the storage requirements relative to a system that stores multiple files that include multiple different versions of media content. When the antiquated "master" version of the media file is deleted, information may be stored for the user that uploaded the antiquated master version, where the information enables the system to reconstruct the antiquated master version from the new master version in order to provide the user with an appropriate version of the content.

In these various examples, the highest quality level "version" of media content which is stored in a master media file is a version from which other versions of the media content that have been uploaded to the server system may be reconstructed. There may be some examples where a newly uploaded media file includes content that is of a higher quality level in some aspects, but not in others, than the content in an existing master media file. For example, the content in an existing master media file may have a high bit rate and may have been encoded using a lossless file format. A newly uploaded media file which includes content encoded with a lower bit rate and using a lossy file format may be uploaded.

The new media file, however, may include content that is longer than the content in the existing master version of the media file. For example, the new media content may be an extended version of a song that includes an additional verse. In this example, if the existing master media file is deleted because the longer song has been uploaded to the server system, the server system may not be able to reconstruct shorter versions of the song that have a high bit rate. Instead, the server system may only be able to generate a short version of the song that has the low bit rate.

In such examples, the server system may store both versions of the song in master media files, and may store an indication that the songs in the master media files match each other. Thus, the server system may reconstruct songs based on the master version that is most appropriate for the song. Should a user of the media storage service later upload an extended version of the song that is encoded with a high bit rate and a lossless file format, the server system may determine that the newly uploaded version of the song can replace both existing master versions of the song, and the existing master versions of the song can be deleted.

Accordingly, a user's uploaded collection of media files may include, (i) for some of the uploaded media files, data identifying the respective master media file and a quality level of the content in the media file that was uploaded, and (ii) for some of the uploaded media files, data identifying that a particular master media file includes content that is the user's version of the media content. In examples where a media file is generated for a user from a master media file, the master media file may have been received from a different user. Thus, the described system may "crowd-source" the best quality level media content.

A user may later access the media that the user has "uploaded" to the media storage service, either using the device at which the songs were uploaded, or another device. For example, a user of the device 102 may have uploaded his media collection 130 when the user was logged into the media storage service with login credentials (e.g., a username and password). The same user may later log into the media storage service using the same login credentials, but with a different device 126, and download all, or user-specified portions, of the stored media.

As an illustration, the user may have a mobile telephone 126 that has a limited amount of local memory. Thus, the user may not be able to locally store on his mobile telephone 126 all of the media files 130 that are stored on his laptop computer 102. The user may access these media file on his mobile telephone 126 using an application program that the user has downloaded to his mobile telephone. The application program may allow the user to browse his media file collection (which has been uploaded to the server system 106) and download or stream select media files to his device. In some examples, the user may not be able to download media content that the user did not upload, but that was uploaded by other users. In some examples, the user is able to browse the media content that he uploaded, but then may view a separate directory of media content that other users uploaded.

For example, the user may request that his mobile telephone 126 play the song "C." The mobile telephone 126 may not have the song "C" stored locally on the telephone, and thus may request that the media content be streamed from the server system 106 (box 122). The server system may receive the request, and in response identify information in the user's records for the song "C." The information may indicate that the song that the user uploaded can be generated based on the master version 116*c* and the data 120*c*, where the data 120*c* may include quality parameters that identifies the quality level of the song "C" which the user originally had uploaded. In particular, the master version of the song 116*c* is downconverted to a lower quality level song that is defined by the quality parameters 120*c*. The lower quality level song may be a same or substantially similar quality level to the song that the user uploaded to the media storage server system 106 (e.g., when using device 102).

The server system 106 may transmit the file "C" to the mobile telephone 126 (box 124). The mobile telephone 126 may display a user interface for playing the song. Although not illustrated in FIG. 1, the interface may include controls for pausing the song, restarting the song, skipping the song, and browsing the other media files that are stored at the server system 106 for the user. The mobile telephone 126 may also include a graphical interface element 128 that includes a prompt encouraging the user to download a higher quality level version of the media content that is playing on the mobile telephone 126.

Upon user-selection of the graphical interface element 128, the mobile telephone 126 may transmit a request to the server system 106, where the request indicates that the user would like to download a higher quality level version of the media content. The server system 106 may provide a higher quality level version to the mobile telephone 126 in response, or may forward the mobile telephone's request to a third-party service (e.g., an online media store). In some examples, in response to the request, the mobile telephone displays an interface for selecting a quality level to purchase (e.g., which of multiple bit rates of the song to purchase). In some examples, the interface element 128 is not displayed when the transmitted file 124 is the master version of the file.

Figure 2:
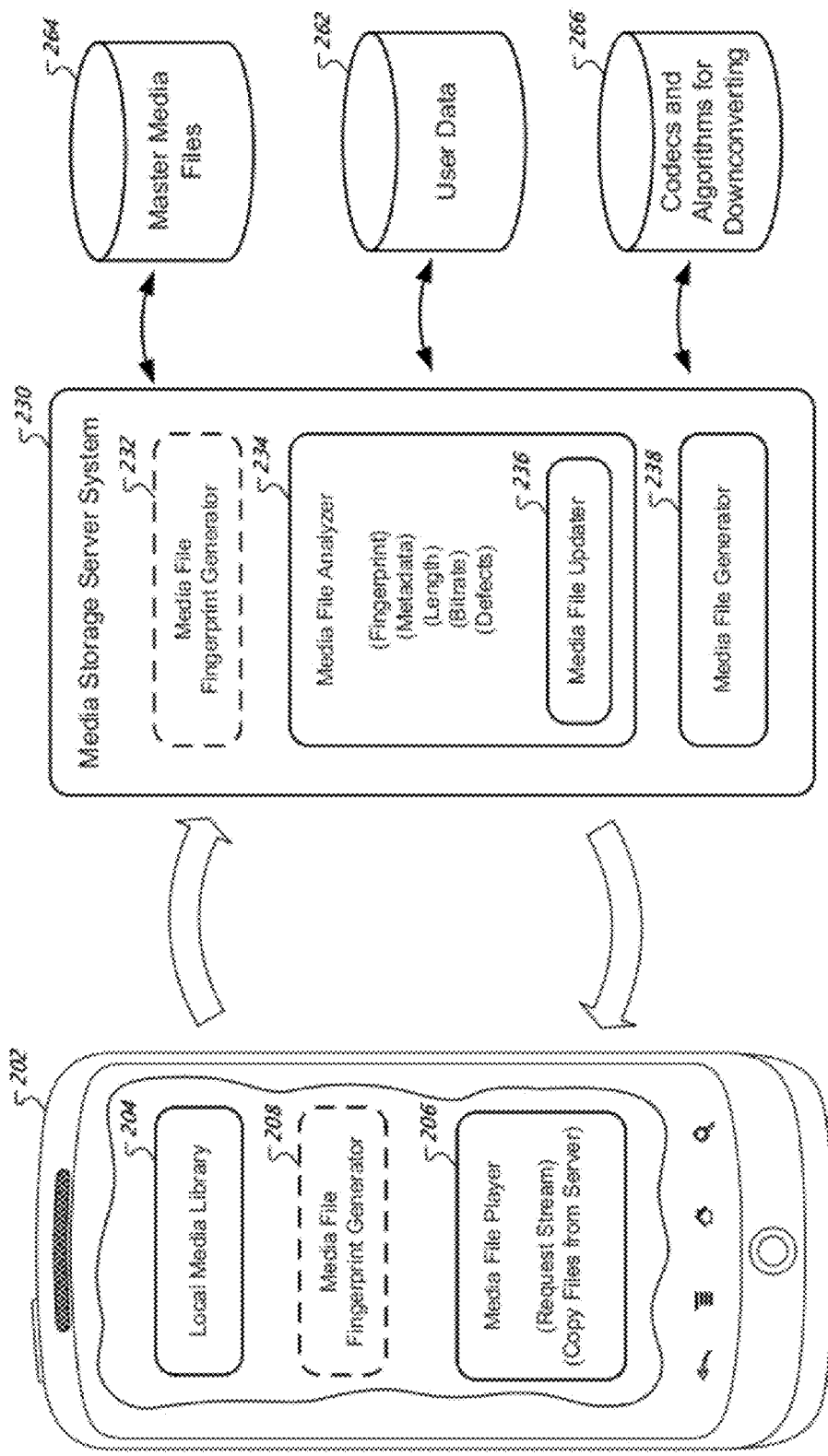
FIG. 2 illustrates an example of a system for performing media file storage.

FIG. 2 is an example system for performing media file storage. The system includes a mobile computing device 202 with a local media library 204 and a media file player 206. The mobile computing device 202 communicates with the media storage server system 230, which includes a media file analyzer 234 that compares the content of media files that have been uploaded to master media files (which are stored in database 264). The media file generator 238 is configured to generate from a master media file a media file that is of a quality level that is defined by the user data 262. The codecs and algorithms 266 are used to generate the media file from the master media file, based on the specifications in the user data.

In more detail, the mobile computing device 202 includes a local media library 204. The local media library includes a collection of data files, where each data file may include content (e.g., digitally encoded audio, video, and/or pictures), and metadata that identifies information about the media content. A user of the mobile computing device 202 may request that the device upload the media library 204 (or portions thereof) to the media storage server system 230. In response, the mobile computing device may transmit to the server system either (i) the files in the media library, or (ii) information that identifies characteristics of the files (e.g., the metadata and media file fingerprints, but not the media content itself).

In the example where media file fingerprints are transmitted to the server system 230, the media file fingerprints are generated at the media file fingerprint generator 208 (at the mobile device). In the example where the media files are transmitted to the server system 230, the media file fingerprints may be generated by the media file fingerprint generator 232 (at the server system). The operation of the media file fingerprint generator is discussed earlier in this document with reference to the generation of acoustic fingerprints.

In either event, the server system 230 receives information that identifies the characteristics of the medial library 204 (either as determined by the mobile computing device, or by the server system). In response, the media file analyzer 234 analyzes the uploaded media content to determine if matching media content is stored at the server system (e.g., whether any of the master media files 264 include matching media content). Thus, the media file analyzer compares content in an uploaded media file to the content of a master media file. The comparison may evaluate in each of the two media files combinations of, for example: media file fingerprints, metadata, media playing length, bit rate, and media defects. Through such comparisons, the media file analyzer may identify master media files that match uploaded media files.

If the uploaded media file is of a lower quality level than a matching master file (as described throughout this document), data is stored in the user data 252 for an account of the user that is uploading the music catalog. The stored data may identify the quality level of the uploaded media file (e.g., information to allow the server system 230 to reconstruct the uploaded media file from the matching master file). The user data 262 may include information identifying the entire uploaded media content for each of the users of the media storage service, and for each uploaded file, information for reconstructing the file from a master media file or information identifying a master media file as the uploaded file.

If matching content is not found in a master media file, the uploaded media file may be stored at the server system and designated as a master media file. If matching content is found in a master media file, but the media file analyzer 234 determines that the master media file includes lower quality level content than the uploaded media file, the media file updater 236 may designate the newly uploaded media file as the new master media file for the content and may remove the old master media file for the content. Additionally, the media file updater 236 may update the user data 262 for the user that uploaded the old master media file, so that the uploading user's reference to the uploaded file (which has now been deleted) references the new master media file and includes quality level information for reconstructing the uploaded media file from the new master media file.

The user of the mobile computing device 202 (or another device at which the user has logged in) may use the media file player 206 to browse the user's remotely stored media library (as designated in the user data repository 262). The user may request that the mobile computing device 202 play media content referenced in the library, and in response, the server system 230 may access the user data 262 to determine whether the requested media content is stored as a master media file for the user, or whether the requested media content must be constructed from a master media file.

If the requested media content is to be constructed from a master media content, the codecs and algorithms for down-converting 266 are applied to the referenced master media file according to the quality attributes that are identified in the user data 262. The requested file is generated and transmitted to the mobile computing device 202 for storage or temporary buffering as a streamed media file.

FIG. 3 illustrates example variations in media content quality level. A determination whether a first quality level of media content is higher than a second quality level of matching media content may consider the below described variations in media content quality.

A media content characteristic that may be used in determining media content quality level is length 302a of the media content. First media content may be determined to be of higher quality level than second media content if the first media content includes the content in the first media content, but also includes additional content. For example, in FIG. 3 the low quality level version of the media content 302b includes several verses (represented by the characters 'A,' 'C,' and 'D'), and a repeating chorus (represented by the character 'B'). The verses and characters may be identified by the media file fingerprint generator of FIG. 2. In this illustration, the same verses have been identified in the high quality level version of the media content 302c, along with an additional verse 'E'). The high quality level version of the media content includes the same chorus, but the chorus is repeated an extra time between each verse. Accordingly, the server system described with reference to FIGS. 1 and 2 may determine that the high quality level version of media content 302c is of higher quality level than the low quality level version 302b.

Another media content characteristic used in determining media content quality level is metadata 302a. The metadata that accompanies media content (e.g., within the same media file) may be used to determine if the media content is of lesser or greater quality level than another version of the media content. In this example, the high quality level metadata 304c includes additional metadata (e.g., the artwork, lyrics, website, distributor, a cappella version, and instrumental version), and thus may be determined to be of higher quality level than a version of the media content 302b that includes only the artist name, song name, and album name.

Another media content characteristic used in determining media content quality level is bit rate 306a. Media content that has been encoded in a higher bit rate may be determined to be of higher quality level than similar media content encoded in a lower bit rate. In this example, the media content with a bit rate of 192 kbps 306c is determined to be of higher quality level than the media content with the bit rate of 128 kbps 306b.

Another media content characteristic used in determining media quality level is a codec or file type 308a. As described above, some codecs and file types may be predefined as being of higher quality level than other codecs. A comparison may be made between two variations in matching media content to determine if one of the media content is associated with a higher quality level codec than the other media content. In this example the "Codec A" 308b has been predefined to be of lower quality level than an uncompressed codec 308c. Accordingly, the media content that has been encoded with the uncompressed codec 308c is determined to be of higher quality level than the media content that was encoded with the Codec A 308b.

Another media content characteristic used in determining media quality level includes defects 310a that have been identified in media content. Media content that has been identified as having fewer instances or total played length of defects may be determined to be of higher quality level than matching media content with more defects. In this example, the media content 310b includes multiple defects (illustrated by the vertical solid lines). The media content 310c does not include any defects, and thus is determined to be of higher quality level than the media content 310b.

As described above with reference to FIG. 1, a first variation of media content may be determined to be of a higher quality level than a second variation of matching media content in some, but not all, characteristics. In such instances, two master media files may be stored at the server system, at least until media content that is of a higher quality level in all measured characteristics than the two master media files is uploaded. In some examples, a subset or a single one of the characteristics that are illustrated in FIG. 3 are used in a determination of media content quality level.

Referring now to FIG. 4, a conceptual diagram of a system that may be used to implement the systems and methods described in this document is illustrated. Mobile computing device 410 can wirelessly communicate with base station 440, which can provide the mobile computing device wireless access to numerous services 460 through a network 450.

In this illustration, the mobile computing device 410 is depicted as a handheld mobile telephone (e.g., a smartphone or an application telephone) that includes a touchscreen display device 412 for presenting content to a user of the mobile computing device 410. The mobile computing device 410 includes various input devices (e.g., keyboard 414 and touchscreen display device 412) for receiving user-input that influences the operation of the mobile computing device 410. In further implementations, the mobile computing device 410 may be a laptop computer, a tablet computer, a personal digital assistant, an embedded system (e.g., a car navigation system), a desktop computer, or a computerized workstation.

The mobile computing device 410 may include various visual, auditory, and tactile user-output mechanisms. An example visual output mechanism is display device 412, which can visually display video, graphics, images, and text that combine to provide a visible user interface. For example, the display device 412 may be a 3.7 inch AMOLED screen. Other visual output mechanisms may include LED status lights (e.g., a light that blinks when a voicemail has been received).

An example tactile output mechanism is a small electric motor that is connected to an unbalanced weight to provide a vibrating alert (e.g., to vibrate in order to alert a user of an incoming telephone call or confirm user contact with the touchscreen 412). Further, the mobile computing device 410 may include one or more speakers 420 that convert an electrical signal into sound, for example, music, an audible alert, or voice of an individual in a telephone call.

An example mechanism for receiving user-input includes keyboard 414, which may be a full qwerty keyboard or a traditional keypad that includes keys for the digits '0-9', '*' and '#.' The keyboard 414 receives input when a user physically contacts or depresses a keyboard key. User manipulation of a trackball 416 or interaction with a trackpad enables the user to supply directional and rate of rotation information to the mobile computing device 410 (e.g., to manipulate a position of a cursor on the display device 412).

The mobile computing device 410 may be able to determine a position of physical contact with the touchscreen display device 412 (e.g., a position of contact by a finger or a stylus). Using the touchscreen 412, various "virtual" input mechanisms may be produced, where a user interacts with a graphical user interface element depicted on the touchscreen 412 by contacting the graphical user interface element. An example of a "virtual" input mechanism is a "software keyboard," where a keyboard is displayed on the touchscreen and a user selects keys by pressing a region of the touchscreen 412 that corresponds to each key.

The mobile computing device 410 may include mechanical or touch sensitive buttons 418a-d. Additionally, the mobile computing device may include buttons for adjusting volume output by the one or more speakers 420, and a button for turning the mobile computing device on or off. A microphone 422 allows the mobile computing device 410 to convert audible sounds into an electrical signal that may be digitally encoded and stored in computer-readable memory, or transmitted to another computing device. The mobile computing device 410 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 410 may present a graphical user interface with the touchscreen 412. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 404. User-selection of the button may invoke the pre-defined action.

In some examples, the operating system provides a "desktop" user interface that is displayed upon turning on the mobile computing device 410, activating the mobile computing device 410 from a sleep state, upon "unlocking" the mobile computing device 410, or upon receiving user-selection of the "home" button 418c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 410 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 412 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 410 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 410 may include other application modules and hardware. A call handling unit may receive an indication of an incoming telephone call and provide a user the capabilities to answer the incoming telephone call. A media player may allow a user to listen to music or play movies that are stored in local memory of the mobile computing device 410. The mobile telephone 410 may include a digital camera sensor, and corresponding image and video capture and editing software. An internet browser may enable the user to view content from a web page by typing in an addresses corresponding to the web page or selecting a link to the web page.

The mobile computing device 410 may include an antenna to wirelessly communicate information with the base station 440. The base station 440 may be one of many base stations in a collection of base stations (e.g., a mobile telephone cellular network) that enables the mobile computing device 410 to maintain communication with a network 450 as the mobile computing device is geographically moved. The computing device 410 may alternatively or additionally communicate with the network 450 through a Wi-Fi router or a wired connection (e.g., Ethernet, USB, or FIREWIRE). The computing device 410 may also wirelessly communicate with other computing devices using BLUETOOTH protocols, or may employ an ad-hoc wireless network.

A service provider that operates the network of base stations may connect the mobile computing device 410 to the network 450 to enable communication between the mobile computing device 410 and other computerized devices that provide services 460. Although the services 460 may be provided over different networks (e.g., the service provider's internal network, the Public Switched Telephone Network, and the Internet), network 450 is illustrated as a single network. The service provider may operate a server system 452 that routes information packets and voice data between the mobile computing device 410 and computing devices associated with the services 460.

The network 450 may connect the mobile computing device 410 to the Public Switched Telephone Network (PSTN) 462 in order to establish voice or fax communication between the mobile computing device 410 and another computing device. For example, the service provider server system 452 may receive an indication from the PSTN 462 of an incoming call for the mobile computing device 410. Conversely, the mobile computing device 410 may send a communication to the service provider server system 452 initiating a telephone call with a telephone number that is associated with a device accessible through the PSTN 462.

The network 450 may connect the mobile computing device 410 with a Voice over Internet Protocol (VoIP) service 464 that routes voice communications over an IP network, as opposed to the PSTN. For example, a user of the mobile computing device 410 may invoke a VoIP application and initiate a call using the program. The service provider server system 452 may forward voice data from the call to a VoIP service, which may route the call over the internet to a corresponding computing device, potentially using the PSTN for a final leg of the connection.

An application store 466 may provide a user of the mobile computing device 410 the ability to browse a list of remotely stored application programs that the user may download over the network 450 and install on the mobile computing device 410. The application store 466 may serve as a repository of applications developed by third-party application developers. An application program that is installed on the mobile computing device 410 may be able to communicate over the network 450 with server systems that are designated for the application program. For example, a VoIP application program may be downloaded from the Application Store 466, enabling the user to communicate with the VoIP service 464.

The mobile computing device 410 may access content on the internet 468 through network 450. For example, a user of the mobile computing device 410 may invoke a web browser application that requests data from remote computing devices that are accessible at designated universal resource locations. In various examples, some of the services 460 are accessible over the internet.

The mobile computing device may communicate with a personal computer 470. For example, the personal computer 470 may be the home computer for a user of the mobile computing device 410. Thus, the user may be able to stream media from his personal computer 470. The user may also view the file structure of his personal computer 470, and transmit selected documents between the computerized devices.

A voice recognition service 472 may receive voice communication data recorded with the mobile computing device's microphone 422, and translate the voice communication into corresponding textual data. In some examples, the translated text is provided to a search engine as a web query, and responsive search engine search results are transmitted to the mobile computing device 410.

The mobile computing device 410 may communicate with a social network 474. The social network may include numerous members, some of which have agreed to be related as acquaintances. Application programs on the mobile computing device 410 may access the social network 474 to retrieve information based on the acquaintances of the user of the mobile computing device. For example, an "address book" application program may retrieve telephone numbers for the user's acquaintances. In various examples, content may be delivered to the mobile computing device 410 based on social network distances from the user to other members. For example, advertisement and news article content may be selected for the user based on a level of interaction with such content by members that are "close" to the user (e.g., members that are "friends" or "friends of friends").

The mobile computing device 410 may access a personal set of contacts 476 through network 450. Each contact may identify an individual and include information about that individual (e.g., a phone number, an email address, and a birthday). Because the set of contacts is hosted remotely to the mobile computing device 410, the user may access and maintain the contacts 476 across several devices as a common set of contacts.

The mobile computing device 410 may access cloud-based application programs 478. Cloud-computing provides application programs (e.g., a word processor or an email program) that are hosted remotely from the mobile computing device 410, and may be accessed by the device 410 using a web browser or a dedicated program. Example cloud-based application programs include GOOGLE DOCS word processor and spreadsheet service, GOOGLE GMAIL webmail service, and PICASA picture manager.

Mapping service 480 can provide the mobile computing device 410 with street maps, route planning information, and satellite images. An example mapping service is GOOGLE MAPS. The mapping service 480 may also receive queries and return location-specific results. For example, the mobile computing device 410 may send an estimated location of the mobile computing device and a user-entered query for "pizza places" to the mapping service 480. The mapping service 480 may return a street map with "markers" superimposed on the map that identify geographical locations of nearby "pizza places."

Turn-by-turn service 482 may provide the mobile computing device 410 with turn-by-turn directions to a user-supplied destination. For example, the turn-by-turn service 482 may stream to device 410 a street-level view of an estimated location of the device, along with data for providing audio commands and superimposing arrows that direct a user of the device 410 to the destination.

Various forms of streaming media 484 may be requested by the mobile computing device 410. For example, computing device 410 may request a stream for a pre-recorded video file, a live television program, or a live radio program. Example services that provide streaming media include YOUTUBE and PANDORA.

A micro-blogging service 486 may receive from the mobile computing device 410 a user-input post that does not identify recipients of the post. The micro-blogging service 486 may disseminate the post to other members of the micro-blogging service 486 that agreed to subscribe to the user.

A search engine 488 may receive user-entered textual or verbal queries from the mobile computing device 410, determine a set of internet-accessible documents that are responsive to the query, and provide to the device 410 information to display a list of search results for the responsive documents. In examples where a verbal query is received, the voice recognition service 472 may translate the received audio into a textual query that is sent to the search engine.

These and other services may be implemented in a server system 490. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 5:
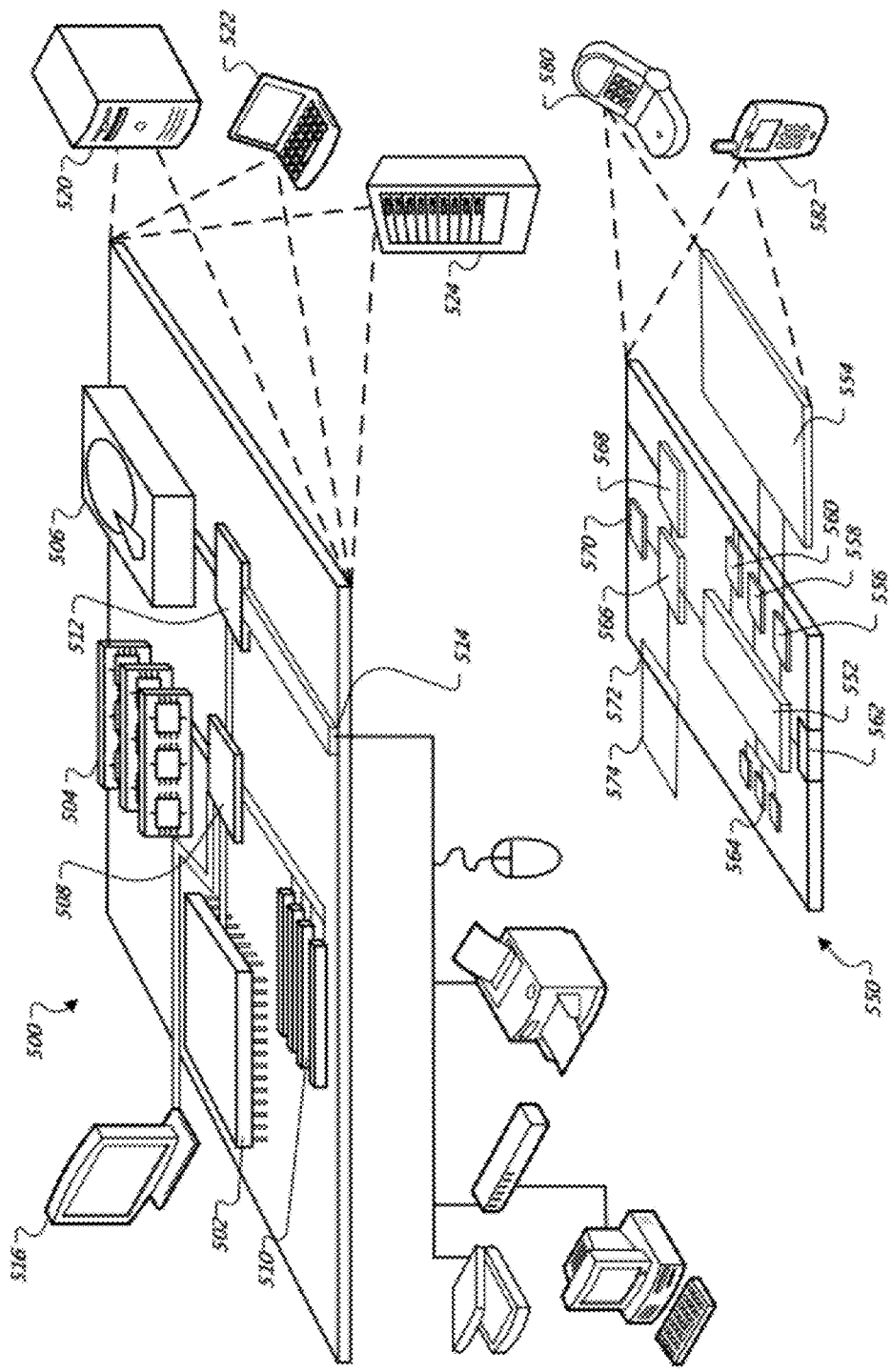
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
storing, by a computing system, a master media file that includes media content at a first quality level;
receiving, by the computing system, a first request to supply a first remote user device with a media file that includes media content that matches the media content included in the master media file;
identifying, by the computing system, that a user of the first remote user device owns a version of the media content included in the master media file at a second quality level that is lower than the first quality level of the master media file;
generating, as a consequence of receiving the first request and using the master media file, a first media file that includes media content that matches the media content included in the master media file and that is at the second quality level;
sending the first media file for receipt by the first remote user device;
identifying, by the computing system, that a matching media file of a second remote user device includes media content that matches the media content included in the master media file and that is of a third quality level that is higher than the first quality level and, as a consequence, storing the matching media file in place of the master media file as an updated master media file, wherein the identifying that the matching media file includes media content that matches the media content included in the master media file includes: (i) accessing data that indicates characteristics of the matching media file and which was generated by the second remote user device, or (ii) receiving the matching media file as an upload by the second remote user device;
receiving, by the computing system and after the matching media file has been stored as the updated master media file, a second request to supply the first remote user device with a media file that includes media content that matches the media content included in the updated master media file;
identifying, by the computing system, that the user of the first remote user device owns a version of the media content included in the updated master media file at the second quality level;
generating, as a consequence of receiving the second request and using the updated master media file, a second media file that includes media content that matches the media content included in the updated master media file and that is at the second quality level; and sending the second media file for receipt by the first remote user device.

2. The method of claim 1, wherein the accessed data includes a fingerprint of the matching media file, the fingerprint including a digital summary of the matching media file that has been generated from an audio or video signal that is stored within the matching media file.

3. The method of claim 1, wherein identifying that the matching media file includes the media content that matches the media content included in the master media file includes determining that an acoustic fingerprint of the matching media file matches an acoustic fingerprint of the master media file.

4. The method of claim 1, wherein identifying that the matching media file includes the media content that is of the third quality level that is higher than the first quality level includes determining that the matching media file encodes an audio signal at a higher bit rate than the master media file.

5. The method of claim 1, wherein identifying that the matching media file includes the media content that is of the third quality level that is higher than the first quality level includes determining that the matching media file encodes an audio signal with less defects in the audio signal than the master media file.

6. The method of claim 1, wherein:
identifying that the user of the first remote device owns the version of the media content included in the updated master media file at the second quality level includes identifying defects that are caused during an audio encoding process; and
generating the second media file includes generating, within the updated master media file that includes the media content at the third quality level, the identified defects.

7. The method of claim 1, wherein:
identifying that the user of the first remote device owns the version of the media content included in the updated master media file at the second quality level includes identifying a shorter in length version of the updated master media file; and
generating the second media file includes generating the identified shorter in length version of the updated master media file.

8. The method of claim 1, wherein sending the second media file for receipt by the first remote user device causes the first remote user device to display a prompt allowing the user of the first remote user device to purchase a version of the second media file that is of a higher quality level than the second media file.

9. The method of claim 1, wherein storing the matching media file in place of the master media file includes deleting the master media file.

10. The method of claim 1, wherein the matching media file is one of multiple media files in a media library that is remotely hosted, for a user of the second remote user device and by the computing system, as a component of a music streaming service, so as to allow the user of the second remote user device to stream each of the multiple media files to the second remote user device for playing.

11. The computer-implemented method of claim 1, wherein the first remote user device is configured to play a version of the media content included in the updated master media file at a fourth quality level that is higher than the second quality level.

12. One or more non-transitory computer-readable storage devices storing instructions that are executable by one or more processing devices to perform operations comprising:
storing, by a computing system, a master media file that includes media content at a first quality level;
receiving, by the computing system, a first request to supply a first remote user device with a media file that includes media content that matches the media content included in the master media file;
identifying, by the computing system, that a user of the first remote user device owns a version of the media content included in the master media file at a second quality level that is lower than the first quality level of the master media file;
generating, as a consequence of receiving the first request and using the master media file, a first media file that includes media content that matches the media content included in the master media file and that is at the second quality level;
sending the first media file for receipt by the first remote user device;
identifying, by the computing system, that a matching media file of a second remote user device includes media content that matches the media content included in the master media file and that is of a third quality level that is higher than the first quality level and, as a consequence, storing the matching media file in place of the master media file as an updated master media file, wherein the identifying that the matching media file includes media content that matches the media content included in the master media file includes: (i) accessing data that indicates characteristics of the matching media file and which was generated by the second remote user device, or (ii) receiving the matching media file as having been uploaded by the second remote user device;
receiving, by the computing system and after the matching media file has been stored as the updated master media file, a second request to supply the first remote user device with a media file that includes media content that matches the media content included in the updated master media file;
identifying, by the computing system, that the user of the first remote user device owns a version of the media content included in the updated master media file at the second quality level;
generating, as a consequence of receiving the second request and using the updated master media file, a second media file that includes media content that matches the media content included in the updated master media file and that is at the second quality level; and
sending the second media file for receipt by the first remote user device.

13. A computer-implemented method comprising:
transmitting data that indicates characteristics of a matching media file, by a first user device and to a server system that is remote from the first user device and that has:
stored a master media file that includes media content at a first quality level,
received a first request to supply the first user device with a media file that includes media content that matches the media content included in the master media file,
identified that a user of the first user device owns a version of the media content included in the master media file at a second quality level that is lower than the first quality level of the master media file, generated, as a consequence of receiving the first request and using the master media file, a first media file that includes media content that matches the media content included in the master media file and that is at the second quality level, and sent the first media file for receipt by the first user device, the transmitting data causing the server system to:

identify that the matching media file includes media content that matches the media content included in the master media file and that is of a third quality level that is higher than the first quality level and, as a consequence, store the matching media file in place of the master media file as an updated master media file, wherein the characteristics of the matching media file were generated by a second user device or the matching media file was uploaded by the second user device, receive, after the matching media file has been stored as the updated master media file, a second request to supply the first user device with a media file that includes media content that matches the media content included in the updated master media file, generate, as a consequence of receiving the second request and using the updated master media file, a second media file that includes media content that matches the media content included in the updated master media file and that is at the second quality level, and send the second media file for receipt by the first remote user device.

14. One or more non-transitory computer-readable storage devices storing instructions that are executable by one or more processing devices to perform operations comprising:

transmitting data that indicates characteristics of a matching media file, by a first user device and to a server system that is remote from the first user device and that has:

stored a master media file that includes media content at a first quality level, received a first request to supply the first user device with a media file that includes media content that matches the media content included in the master media file, identified that a user of the first user device owns a version of the media content included in the master media file at a second quality level that is lower than the first quality level of the master media file, generated, as a consequence of receiving the first request and using the master media file, a first media file that includes media content that matches the media content included in the master media file and that is at the second quality level, and sent the first media file for receipt by the first user device, the transmitting data causing the server system to:

identify that the matching media file includes media content that matches the media content included in the master media file and that is of a third quality level that is higher than the first quality level and, as a consequence, store the matching media file in place of the master media file as an updated master media file, wherein the characteristics of the matching media file were generated by a second user device or the matching media file was uploaded by the second user device, receive, after the matching media file has been stored as the updated master media file, a second request to supply the first user device with a media file that includes media content that matches the media content included in the updated master media file, generate, as a consequence of receiving the second request and using the updated master media file, a second media file that includes media content that matches the media content included in the updated master media file and that is at the second quality level, and send the second media file for receipt by the first remote user device.

15. A system for storing media files, the system comprising:

one or more computer processors;

a media file analyzer, executable by the one or more computer processors, that is programmed to identify that a matching media file owned by a user of a first remote user device includes media content (a) that matches media content included in a master media file and (b) that is of a second quality level that is higher than a first quality level of the master media file and, as a consequence, store the matching media file in place of the master media file as an updated master media file wherein the identifying that the matching media file includes media content that matches the media content included in the master media file includes: (i) accessing data that indicates characteristics of the matching media file and which was generated by the first user device, or (ii) receiving the matching media file as an upload by the first user device;

a media file generator, executable by the one or more computer processors, that is programmed to:

receive a first request to supply a second remote user device with a media file that includes media content that matches the media content included in the master media file, identify that a user of the second remote user device owns a version of the media content included in the master media file at a third quality level that is lower than the first quality level of the master media file, generate, as a consequence of receiving the first request and using the master media file, a first media file that includes media content that matches the media content included in the master media file and that is at the third quality level, send the first media file for receipt by the second remote user device, receive, after the matching media file has been stored as the updated master media file, a second request to supply the second remote user device with a media file that includes media content that matches the media content included in the updated master media file, generate, as a consequence of receiving the second request and using the updated master media file, a second media file that includes media content that matches the media content included in the updated master media file and that is at the third quality level, and send the second media file for receipt by the second remote user device.

16. The system of claim 15, further comprising a digital summary generator, executable by the one or more computer processors, that is programmed to generate digital summaries of audio signals stored in media files, wherein a digital summary that is generated for the matching media file and a digital summary that is generated for the master media file are used in the identifying by the media file analyzer that the matching media file includes the media content that matches the media content included in the master media file.

17. The system of claim 15, further comprising a media file updater, executable by the one or more computer processors, that is programmed to, as a consequence of the media file analyzer storing the received matching media file in place of the master media file, delete the master media file.

18. The system of claim 17, wherein the media file updater is programmed to delete, in addition to the master media file, another master media file that the media file analyzer has determined to include media content that matches the media content of the matching media file.

19. The system of claim 15, wherein the matching media file is one of multiple media files in a media library remotely hosted, for the user of the first remote user device by the server system, as a component of a music streaming service, so as to allow the user of the first remote user device to stream each of the multiple media files to the first remote user device for playing.

* * * * *